United States Patent
Shiono et al.

(10) Patent No.: US 6,987,615 B2
(45) Date of Patent: Jan. 17, 2006

(54) DIFFRACTIVE OPTICAL ELEMENT AND OPTICAL HEAD USING THE SAME

(75) Inventors: Teruhiro Shiono, Osaka (JP); Hidenori Wada, Uji (JP); Seiji Nishino, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/264,467

(22) Filed: Oct. 4, 2002

(65) Prior Publication Data

US 2003/0067686 A1 Apr. 10, 2003

(30) Foreign Application Priority Data

Oct. 5, 2001 (JP) .................................. 2001-309587

(51) Int. Cl.
*G02B 5/18* (2006.01)

(52) U.S. Cl. ................ 359/569; 359/566; 369/112; 369/109; 369/44.23; 369/103

(58) Field of Classification Search ................ 359/569, 359/566, 565, 571; 369/102, 103, 112, 44.23
See application file for complete search history.

(56) References Cited

U.S. PATENT DOCUMENTS

| | | | |
|---|---|---|---|
| 5,696,750 A | | 12/1997 | Katayama |
| 6,084,710 A | | 7/2000 | Katsuma |
| 6,084,843 A | * | 7/2000 | Abe et al. .................... 369/112 |
| 6,449,095 B1 | * | 9/2002 | Ohtaki et al. ............... 359/566 |
| 6,545,821 B2 | * | 4/2003 | Katsuma ..................... 359/565 |
| 6,870,805 B1 | | 3/2005 | Arai et al. ................... 369/112 |

FOREIGN PATENT DOCUMENTS

| | | |
|---|---|---|
| JP | 11-174218 | 7/1999 |
| JP | 2001-195769 | 7/2001 |
| JP | 2001-209966 | 8/2001 |

* cited by examiner

*Primary Examiner*—Audrey Chang
(74) *Attorney, Agent, or Firm*—Merchant & Gould P.C.

(57) ABSTRACT

A diffractive optical element emits substantially zero order diffracted light when light with a wavelength of 0.35 μm to 0.45 μm is incident and emits substantially first-order diffracted light when light with a wavelength of 0.6 μm to 0.7 μm is incident. The diffractive optical element includes a substrate and a grating portion formed on the substrate. The grating portion has a step-wise cross section with any one of levels selected from four levels, five levels and six levels. The diffractive optical element emits substantially zero-order diffracted light when light with a first wavelength $\lambda 1$ satisfying the relationship: 0.35 μm$\leq \lambda 1 \leq$0.45 μm is incident and emits substantially first-order diffracted light when light with a second wavelength $\lambda 2$ satisfying the relationship: 0.6 μm$\leq \lambda 2 \leq$0.7 μm is incident.

20 Claims, 11 Drawing Sheets

DIFFRACTIVE OPTICAL ELEMENT AND OPTICAL HEAD USING THE SAME

BACKGROUND OF THE INVENTION

1. Field of the Invention

The present invention relates to a diffractive optical element and an optical head using the same. In particular, the present invention relates to a diffractive optical element that emits substantially zero-order diffracted light when light with a wavelength of 0.35 μm to 0.45 μm is incident and emits substantially first-order diffracted light when light with a wavelength of 0.6 μm to 0.7 μm is incident, and an optical head using the same.

2. Description of the Related Art

JP 3047351B discloses a diffractive optical element having a step-wise cross section with four levels, which emits substantially zero-order diffracted light (transmitted light) when light with a red wavelength is incident and emits substantially minus first-order diffracted light when light with an infrared wavelength that is longer than the red wavelength is incident. JP 3047351B also discloses an optical head using the above-mentioned diffractive optical element.

However, even if the technique disclosed in JP 3047351B is applied for both light with the violet wavelength and light with the red wavelength, it is not possible to realize a diffractive optical element that emits substantially zero-order diffracted light (transmitted light) when light with a violet wavelength, which is a shorter wavelength, is incident and emits substantially minus first-order diffracted light when light with a red wavelength, which is longer than the violet wavelength, is incident.

SUMMARY OF THE INVENTION

Therefore, with the foregoing in mind, it is an object of the present invention to provide a diffractive optical element that emits substantially zero-order diffracted light when light with a wavelength of 0.35 μm to 0.45 μm is incident and emits substantially first-order diffracted light when light with a wavelength of 0.6 μm to 0.7 μm is incident, and an optical head using the same.

In order to achieve the above-mentioned object, a diffractive optical element according to the present invention includes a substrate and a grating portion formed on the substrate, wherein the grating portion has a step-wise cross section with substantially any one of levels selected from four levels, five levels and six levels, and the diffractive optical element emits substantially zero-order diffracted light when light with a first wavelength $\lambda 1$ satisfying the relationship: 0.35 μm≦$\lambda 1$≦0.45 μm is incident and emits substantially first-order diffracted light when light with a second wavelength $\lambda 2$ satisfying the relationship: 0.6 μm≦$\lambda 2$≦0.7 μm is incident.

According to this diffractive optical element, it is possible to realize the diffractive optical element that emits substantially zero-order diffracted light (transmitted light) when light with a violet wavelength, which is a shorter wavelength, is incident and emits substantially first-order diffracted light when light with a red wavelength, which is longer than the violet wavelength, is incident.

Furthermore, in the diffractive optical element according to the present invention, it is preferable that the element emits substantially zero-order diffracted light when light with a third wavelength $\lambda 3$ satisfying the relationship: 0.75 μm≦$\lambda 3$≦0.85 μm is incident.

Furthermore, in the diffractive optical element according to the present invention, it is preferable that a depth of grooves of the grating portion is expressed by substantially $2\lambda 1(p-1)/(n-1)$ where p denotes the number of levels of the grating portion (p is any one of levels selected from four, five and six, and n denotes a refractive index of the grating portion). With this preferable example, it is possible to improve the transmission efficiency of light with a first wavelength $\lambda 1$ to approximately the maximum level.

Furthermore, in the diffractive optical element according to the present invention, it is preferable that the refractive index of the grating portion is 2 or more. With this preferable example, it is possible to improve the efficiency of light utilization (zero-order diffraction efficiency or first-order diffraction efficiency). Furthermore, in this case, it is preferable that a material of the grating portion is one selected from the group consisting of tantalum oxide, lithium niobate, lithium tantalite, titanium oxide, niobium oxide and gallium phosphorus, or a material including the selected material as a main component. Furthermore, in this case, it is preferable that a material of the grating portion includes one selected from the group consisting of tantalum oxide, lithium niobate, lithium tantalite, titanium oxide, niobium oxide and gallium phosphorus as a main component, and at least one selected from the group consisting of titanium, niobium, tantalum and lithium as an accessory component.

Furthermore, in the diffractive optical element according to the present invention, it is preferable that the grating portion is formed by depositing a thin film on the substrate to the thickness of larger than $2\lambda 1(p-1)/(n-1)$ and processing the thin film, where p denotes the number of levels of the grating portion (p is any one of levels selected from four, five and six), and n denotes a refractive index of the grating portion, and a depth of grooves of the grating portions is expressed by substantially $2\lambda 1(p-1)/(n-1)$. With this preferable example, since it is not necessary to form the substrate and the grating portion of the same materials, the degree of freedom of design is improved. Furthermore, the etching rate of the thin film is made to be constant when the etching is carried out, thus improving the accuracy of the depth of grooves of the grating portion.

Furthermore, an optical head according to a first configuration of the present invention includes a first light source emitting light with a first wavelength $\lambda 1$ satisfying the relationship: 0.35 μm≦$\lambda 1$≦0.45 μm, a second light source emitting light with a second wavelength $\lambda 2$ satisfying the relationship: 0.6 μm≦$\lambda 2$≦0.7 μm, an objective lens for converging light with the first wavelength $\lambda 1$ and light with the second wavelength $\lambda 2$ respectively onto a first information recording medium having a first transparent protective layer or a second information recording medium having a second transparent protective layer that is thicker than the first transparent protective layer, a photo-detector for detecting light from the first and second information recording media, and the diffractive optical element according to in claim 1, which is disposed in a common light path of light with both wavelengths between the light source and the objective lens. When the light with the first wavelength $\lambda 1$ is incident in the diffractive optical element, the diffractive optical element emits substantially zero-order diffracted light and the zero-order diffracted light is converged onto the first information recording medium by the objective lens. When the light with the second wavelength $\lambda 2$ is incident on the diffractive optical element, the diffractive optical element emits substantially first-order diffracted light and the first-order diffracted light is converged onto the second information recording medium by the objective lens.

Furthermore, an optical head according to a second configuration of the present invention includes a first light source emitting light with a first wavelength $\lambda 1$ satisfying the relationship: 0.35 $\mu$m$\leq\lambda 1\leq$0.45 $\mu$m, a second light source emitting light with a second wavelength $\lambda 2$ satisfying the relationship: 0.6 $\mu$m$\leq\lambda 2\leq$0.7 $\mu$m, an objective lens for converging the light with the first wavelength $\lambda 1$ and the light with the second wavelength $\lambda 2$ respectively onto a first information recording medium having a first transparent protective layer or a second information recording medium having a second transparent protective layer that is thicker than the first transparent protective layer, a photo-detector for detecting light from the first and second information recording media, and the diffractive optical element according to claim 1, which is disposed in a common light path of light with both wavelengths between the objective lens and the information recording media. When the light with the first wavelength $\lambda 1$ emitted from the objective lens is incident on the diffractive optical element, the diffractive optical element emits substantially zero-order diffracted light and the zero-order diffracted light is converged onto the first information recording medium. When the light with the second wavelength $\lambda 2$ emitted from the objective lens is incident on the diffractive optical element, the diffractive optical element emits substantially first-order diffracted light and the first-order diffracted light is converged onto the second information recording medium.

Furthermore, an optical head according to a third configuration of the present invention includes a first light source emitting light with a first wavelength $\lambda 1$ satisfying the relationship: 0.35 $\mu$m$\leq\lambda 1\leq$0.45 $\mu$m, a second light source emitting light with a second wavelength $\lambda 2$ satisfying the relationship: 0.6 $\mu$m$\leq\lambda 2\leq$0.7 $\mu$m, an objective lens including first and second lenses for converging the light with a first wavelength $\lambda 1$ and the light with a second wavelength $\lambda 2$ respectively onto a first information recording medium having a first transparent protective layer or a second information recording medium having a second transparent protective layer that is thicker than the first transparent protective layer, a photo-detector for detecting light from the first and second information recording media, and the diffractive optical element according to claim 1, which is disposed in a common optical path between the first lens and the second lens. When the light with the first wavelength $\lambda 1$ emitted from the first lens is incident on the diffractive optical element, the diffractive optical element emits substantially zero-order diffracted light and the zero-order diffracted light is converged onto the first information recording medium by the second lens. When the light with the second wavelength $\lambda 2$ emitted from the first lens is incident on the diffractive optical element, the diffractive optical element emits substantially first-order diffracted light and the first-order diffracted light is converged onto the second information recording medium by the second lens.

Furthermore, in the optical head according to the first to third configurations, it is preferable that the diffractive optical element corrects the sum of a spherical aberration of the objective lens with respect to the light with a second wavelength $\lambda 2$ and a spherical aberration generated when the emitted light corresponding to the light with a second wavelength $\lambda 2$ from the objective lens passes through the second transparent protective layer of the second information recording medium.

Furthermore, in the optical head according to the first to third configurations, it is preferable that a working distance from the objective lens to the second information recording medium is smaller than a working distance from the objective lens to the first information recording medium.

Furthermore, in the optical head according to the first to third configurations, it is preferable that a working distance from the objective lens to the second information recording medium is larger than a working distance from the objective lens to the first information recording medium.

Furthermore, an optical head according to a fourth configuration of the present invention includes a first light source emitting light with a first wavelength $\lambda 1$ satisfying the relationship: 0.35 $\mu$m$\leq\lambda 1\leq$0.45 $\mu$m, a second light source emitting light with a second wavelength $\lambda 2$ satisfying the relationship: 0.6 $\mu$m$\leq\lambda 2\leq$0.7 $\mu$m, an objective lens for converging the light with a first wavelength $\lambda 1$ and the light with a second wavelength $\lambda 2$ respectively onto a first information recording medium or a second information recording medium, a photo-detector for detecting light from the first and second information recording media, and a diffractive optical element according to claim 1, which is disposed in a common light path of the light with both wavelengths between the light sources and the objective lens. When the light with the first wavelength $\lambda 1$ is incident on the diffractive optical element, the diffractive optical element emits substantially zero-order diffracted light and the zero-order diffracted light is converged onto the first information recording medium by the objective lens. When the light with the second wavelength $\lambda 2$ is incident on the diffractive optical element, the diffractive optical element emits substantially first-order diffracted light, and the optical axis of the first-order diffracted light is allowed to coincide substantially with the optical axis of the light with a first wavelength $\lambda 1$ and thereafter converged onto the second information recording medium by the objective lens.

DETAILED DESCRIPTION OF THE INVENTION

Hereinafter, the present invention will be described more concretely by way of embodiments.

[First Embodiment]

Figure 1A:
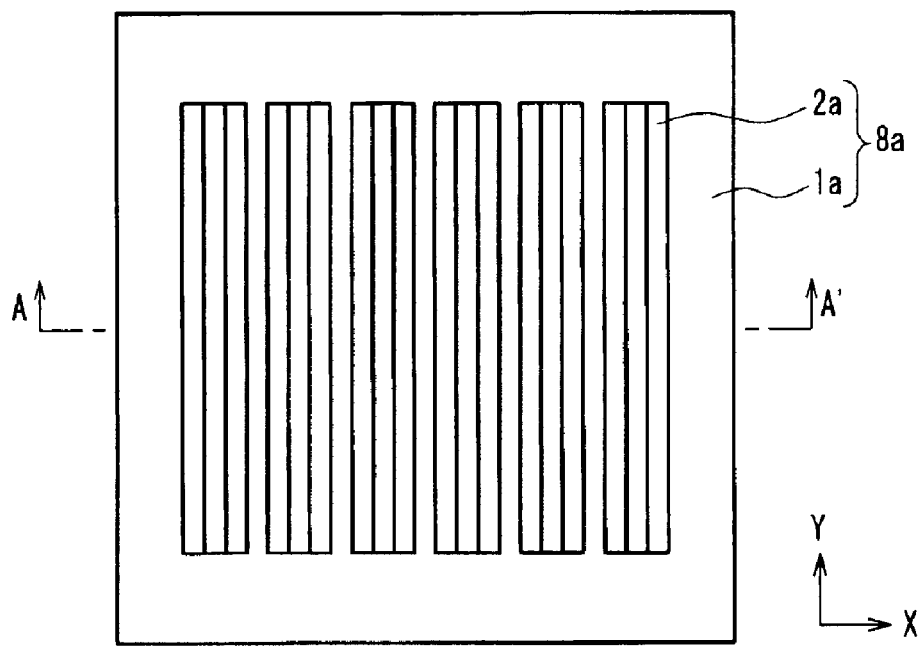
FIG. 1A is a plan view showing a diffractive optical element according to a first embodiment of the present invention.
Figure 1B:
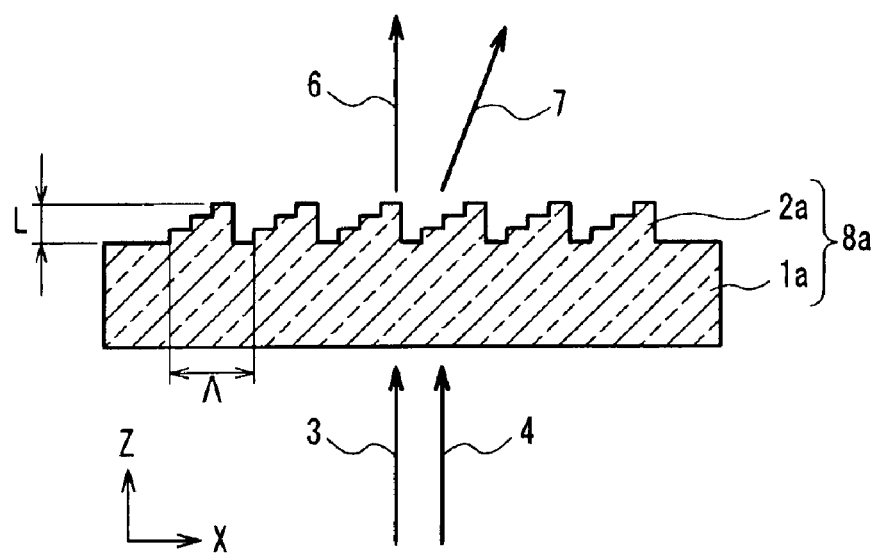
FIG. 1B is a cross-sectional view taken along the line A–A' in FIG. 1A.

First, a diffractive optical element according to a first embodiment of the present invention will be described in detail with reference to FIG. 1 with the coordinate axis defined as shown in the figures. FIG. 1A is a plan view showing a diffractive optical element according to a first embodiment of the present invention, and FIG. 1B is a cross-sectional view taken along the line A–A' in FIG. 1A.

As shown in FIG. 1, the diffractive optical element 8a of this embodiment includes a substrate 1a and a grating portion 2a formed on the substrate 1a. Herein, the grating portion 2a has a step-wise cross section with substantially any one of levels selected from four levels, five levels and six levels (FIG. 1 shows the grating portion 2a having the step-wise cross section with four levels). The diffractive optical element 8a emits substantially zero-order diffracted light 6 (zero-order diffracted light means transmitted light) when light 3 with a first wavelength $\lambda 1$ satisfying the relationship: $0.35 \mu m \leq \lambda 1 \leq 0.45 \mu m$ is incident from the rear surface thereof (a surface opposite to a surface on which the grating portion 2a is formed). Furthermore, the diffractive optical element 8a emits substantially first-order diffracted light 7 when light 4 with a second wavelength $\lambda 2$ satisfying the relationship: $0.6 \mu m \leq \lambda 2 \leq 0.7 \mu m$ is incident from the rear surface thereof. Therefore, the diffractive optical element 8a of this embodiment functions as a mere transmission device with respect to the light 3 with the first wavelength $\lambda 1$ and functions as an optical deflection element with respect to the light 4 with the second wavelength $\lambda 2$.

In this embodiment, the first-order diffracted light means diffracted light emitted in the direction shown by an arrow 7 in FIG. 1 for the groove structure of the grating portion 2a of FIG. 1. In other words, in this embodiment, a diffracted light, which is emitted in the direction in which refracted light is generated when the step-wise cross section of the grating portion 2a is approximated by a saw-tooth shape (blaze shape), is referred to as "first-order diffracted light." On the other hand, diffractive light emitted in the direction symmetrical to the first-order diffracted light with respect to the Z-axis is referred to as "minus first-order diffracted light." Note here that this definition will be applied to the other embodiments.

By setting a depth L of the grooves of the grating portion 2a to be substantially $L = 2\lambda 1(p-1)/(n-1)$ where $\lambda 1$ denotes a first wavelength, p denotes the number of levels of the steps of the grating portion 2a (p is any one of levels selected from four, five and six) and n denotes a refractive index of the grating portion 2a, it is possible to improve the transmission efficiency of the light 3 with the first wavelength $\lambda 1$ to approximately the maximum level. For example, in the case where the number of levels is four (p=4) and $\lambda 1=0.405 \mu m$, $\lambda 2=0.658 \mu m$ and n=1.5 are satisfied, the desirable depth L of the grooves of the grating portion 2a is 4.86 $\mu m$.

The transmission efficiency of the light 3 with the first wavelength $\lambda 1$ is reduced as the period $\Lambda$ of the grating portion 2a is reduced. When the period $\Lambda$ of the grating portion 2a was 20 times or more as large as the first wavelength $\lambda 1$, the transmission efficiency was about 70 to 95%. Furthermore, when the period $\Lambda$ of the grating portion 2a was 20 times or more as large as the second wavelength $\lambda 2$, the first-order diffraction efficiency of the light 4 with the second wavelength $\lambda 2$ was about 65 to 75%. The period $\Lambda$ of the grating portion 2a may be determined in accordance with the diffraction angle of the first-order diffracted light 7 corresponding to the light 4 with the second wavelength $\lambda 2$.

Furthermore, in the diffractive optical element 8a including the grating portion 2a having the step-wise cross section with five levels (p=5), in the case where, for example, $\lambda 1=0.405 \mu m$, $\lambda 2=0.658 \mu m$ and n=1.5 are satisfied, the desirable depth L of the grooves of the grating portion 2a is 6.48 $\mu m$. In this case, the transmission efficiency of the light 3 with the first wavelength $\lambda 1$ was about several % to 5% lower than that of the diffractive optical element 8a having the step-wise cross section with four levels (p=4) since the depth L of the grooves of the grating portion 2a is greater than that of the diffractive optical element 8a having the step-wise cross section with four levels. In addition, in this case, the first-order diffraction efficiency of the light 4 with the second wavelength $\lambda 2$ also was reduced by about several % to 5% as compared with that of the diffractive optical element 8a having the step-wise cross section with four levels.

Furthermore, in the diffractive optical element 8a having six levels (p=6), in the case where, for example, $\lambda 1=0.405 \mu m$, $\lambda 2=0.658 \mu m$ and n=1.5 are satisfied, the desirable depth L of the grooves of the grating portion 2a is 8.1 $\mu m$. In this case, the transmission efficiency of the light 3 with the first wavelength $\lambda 1$ was about several % to 5% lower than that of the diffractive optical element 8a having the step-wise cross section with five levels (p=5) since the depth L of the grooves of the grating portion 2a is further greater than that of the diffractive optical element 8a having the step-wise cross section with five levels. The first-order diffraction efficiency of the light 4 with the second wavelength $\lambda 2$ becomes about 50% to 60%, which is reduced as compared with that of the diffractive optical element having the step-wise cross section with four levels (p=4) or five levels (p=5).

In the diffractive optical element 8a of this embodiment, a glass substrate is used as the substrate 1a. By repeating photolithography and ion-etching in accordance with the number of levels p (in the case of four levels (p=4), repeating twice; and in the case of the five levels (p=5) and six levels (p=6), repeating three times), the grating portion 2a is formed in a state in which it is engraved on the substrate (glass substrate) 1a. The substrate 1a and the grating portion 2a are formed into one piece by using same materials, and thus the structure of the diffractive optical element 8a becomes stable. Furthermore, on the grating portion 2a, an antireflection (referred to as "AR" in the following) coating is applied, thus reducing the reflection loss on the surface of the diffractive optical element 8a.

In this embodiment, the light 3 with the first wavelength $\lambda 1$ and the light 4 with the second wavelength $\lambda 2$ are incident from the rear surface of the diffractive optical element 8a, but the light may be incident from the front surface of the diffractive optical element 8a.

Furthermore, also in the diffractive optical element 8a in this embodiment, by setting the refractive index n of the grating portion 2a to be two or more, it is possible to improve the efficiency of light utilization (zero-order diffraction efficiency or first-order diffraction efficiency), which will be described in detail in the following second embodiment.

[Second Embodiment]

Next, the diffractive optical element according to a second embodiment of the present invention will be described in detail with reference to FIGS. 2 to 4.

Figure 2A:
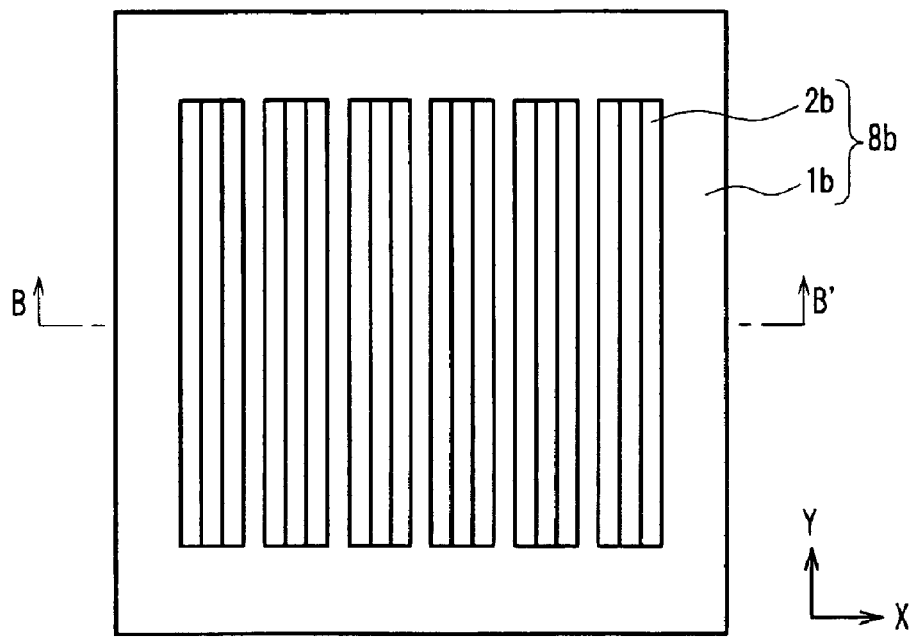
FIG. 2A is a plan view showing a diffractive optical element according to a second embodiment of the present invention.
Figure 2B:
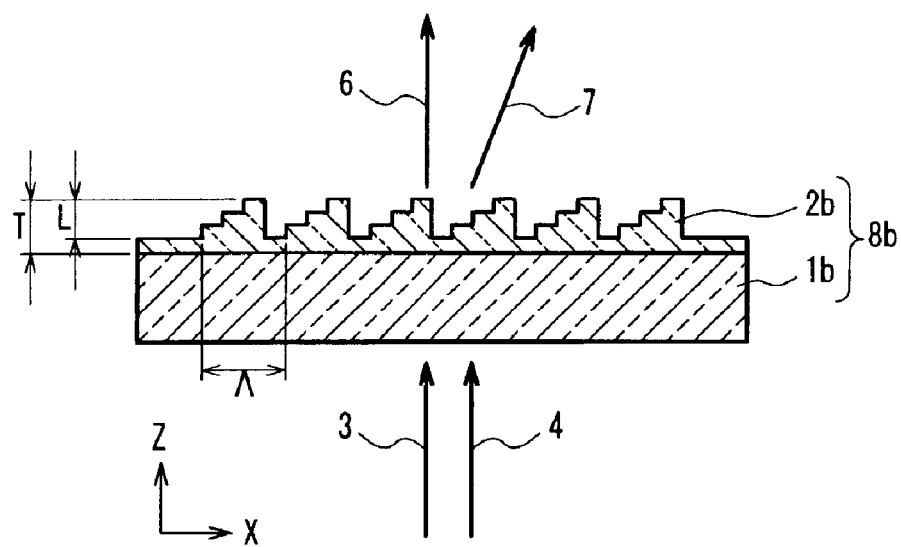
FIG. 2B is a cross-sectional view taken along the line B–B' in FIG. 2A.

FIG. 2A is a plan view showing a diffractive optical element according to the second embodiment of the present invention; and FIG. 2B is a cross-sectional view taken along the line B–B' in FIG. 2A.

As shown in FIG. 2, the diffractive optical element 8b of this embodiment includes a substrate 1b and a grating portion 2b formed on the substrate 1b. Herein, the grating portion 2b has a step-wise cross section with substantially any one of levels selected from four levels, five levels and six levels (FIG. 2 shows the grating portion 2b having the step-wise cross section with four levels). The diffractive optical element 8b emits substantially zero-order diffracted light 6 when light 3 with a first wavelength $\lambda 1$ satisfying the relationship: $0.35 \mu m \leq \lambda 1 \leq 0.45 \mu m$ is incident from the rear surface thereof (a surface opposite to a surface on which the grating portion 2b is formed). Furthermore, the diffractive optical element 8b emits substantially first-order diffracted light 7 when light 4 with a second wavelength $\lambda 2$ satisfying the relationship: $0.6 \mu m \leq \lambda 2 \leq 0.7 \mu m$ is incident from the rear surface thereof. The diffractive optical element 8b of this embodiment is different from the diffractive optical element 8a of the first embodiment in that the substrate 1b and the grating portion 2b are formed of different materials.

In the diffractive optical element 8b of this embodiment, as the substrate 1b, for example, a glass substrate or a resin substrate is used. By depositing a thin film on the substrate 1b to the thickness T and repeating photolithography and ion-etching in accordance with the number of levels p (in the case of four levels (p=4), repeating twice; and in the case of the five levels (p=5) and six levels (p=6), repeating three times), the grating portion 2b is formed in a state in which the thin film is engraved by the maximum thickness of L. In this case, since the substrate 1b and the grating portion 2b are not required to be formed of same materials, the degree of freedom of design is improved.

Furthermore, by setting the thickness T of the thin film to be larger than the depth L of the grooves of the grating portion 2b, the etching rate of the thin film was made to be constant when the etching was carried out, thus enabling the accuracy of the depth L of the grooves of the grating portion 2b to be improved. This is thought because in the thin film deposited in the vicinity of the surface of the substrate 1b, the density is non-uniform due to the influence of the interface between the substrate and the thin film, but the density becomes uniform as the thickness T of the thin film is increased.

Also in this embodiment, similar to the above-mentioned first embodiment, by setting a depth L of the grooves of the grating portion 2b to be substantially $L=2\lambda 1(p-1)/(n-1)$ where $\lambda 1$ denotes a first wavelength, p denotes the number of levels of the steps of the grating portion 2b (p is any one of levels selected from four, five and six) and n denotes the refractive index of the grating portion 2b, it is possible to improve the transmission efficiency of the light 3 with the first wavelength $\lambda 1$ to approximately the maximum level. The present inventors have found that by setting the refractive index n of the grating portion 2b to be two or more, it is possible to improve the efficiency of light utilization (zero-order diffraction efficiency or first-order diffraction efficiency).

Figure 3:
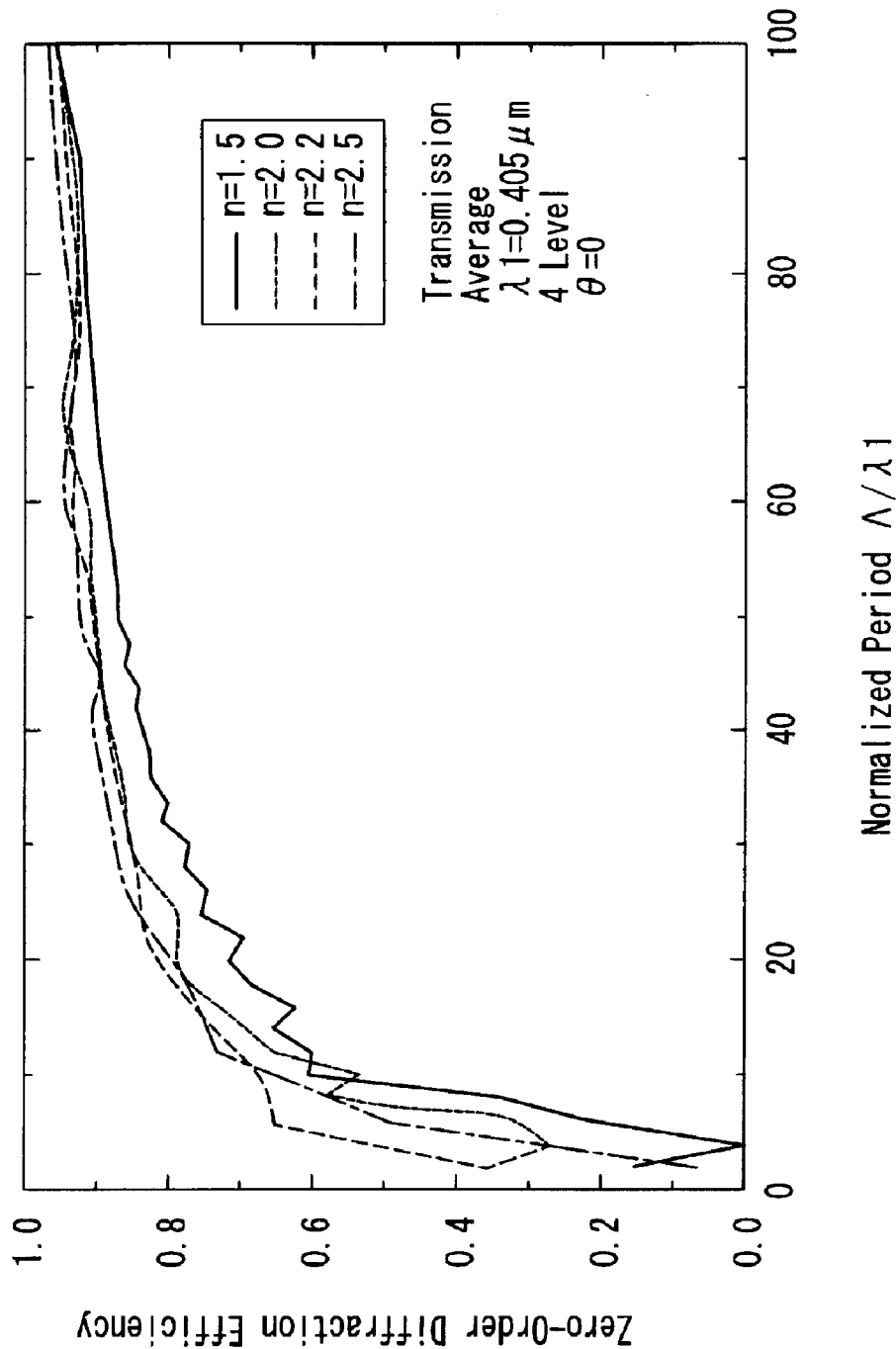
FIG. 3 is a graph showing the relationship between the normalized period $\Lambda/\lambda 1$ and the zero-order diffraction efficiency with respect to light with a first wavelength $\lambda 1$ in the diffractive optical element (in the case where a grating portion has a step-wise cross section with four levels) according to the second embodiment of the present invention.
Figure 4:
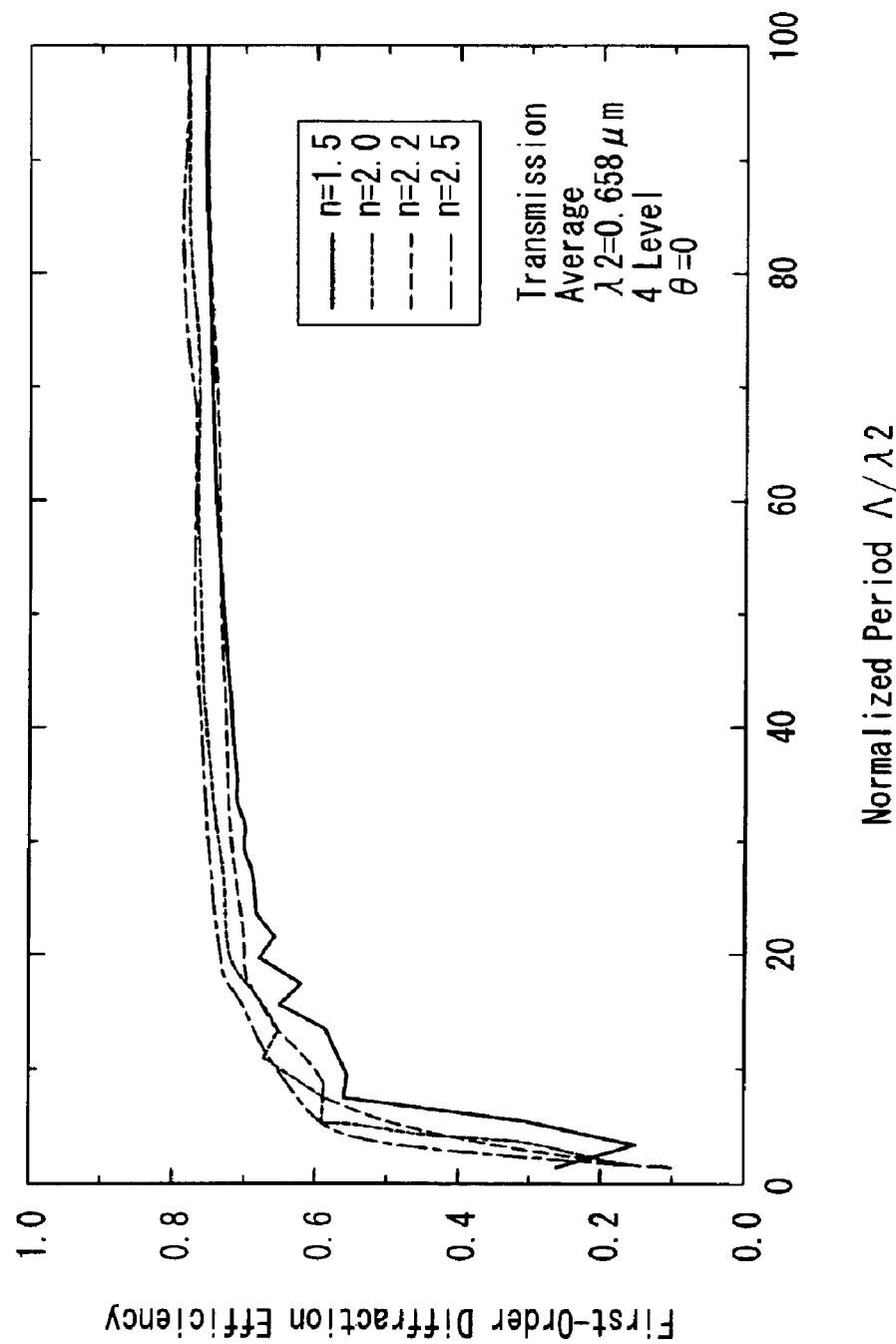
FIG. 4 is a graph showing the relationship between the normalized period $\Lambda/\lambda 2$ and the first-order diffraction efficiency with respect to light with a second wavelength $\lambda 2$ in the diffractive optical element (in the case where a grating portion has a step-wise cross section with four levels) according to the second embodiment of the present invention.

FIG. 3 is a graph showing the relationship between the normalized period $\Lambda/\lambda 1$ and the zero-order diffraction efficiency with respect to light with a first wavelength $\lambda 1$ in the diffractive optical element (in the case where the grating portion has the step-wise cross section with four levels) according to the second embodiment of the present invention. Furthermore, FIG. 4 is a graph showing the relationship between the normalized period $\Lambda/\lambda 2$ and the first-order diffraction efficiency with respect to light with a second wavelength $\lambda 2$ in the diffractive optical element (n the case where the grating portion has the step-wise cross section with four levels) according to the second embodiment of the present invention. FIGS. 3 and 4 show the diffraction efficiency in the case of four kinds of the refractive indexes n of the grating portion 2b: 1.5, 2.0, 2.2, and 2.5. It is found that the efficiency of light utilization (zero-order diffraction efficiency or first-order diffraction efficiency) is improved by setting the refractive index n of the grating portion 2b to be two or more. Furthermore, FIGS. 3 and 4 show that as the refractive index n of the grating portion 2b is larger, the improvement of the efficiency tends to be larger. In the diffractive optical element 8b of this embodiment, as the material for the grating portion 2b, which has the refractive index n of two or more, tantalum oxide is used.

Furthermore, as is apparent from the relationship: $L=2\lambda 1(p-1)/(n-1)$, as the refractive index n of the grating portion 2b becomes larger, the desirable depth L of grooves of the grating portion 2b becomes smaller. Therefore, it is possible to realize an easy production process (shortening of etching time, improvement of accuracy, etc.).

In the diffractive optical element 8b of this embodiment, as the material for the grating portion 2b, tantalum oxide is used. However, besides tantalum oxide, lithium niobate, lithium tantalite, titanium oxide, niobium oxide or gallium phosphorus may be used. Furthermore, as the material for grating portion 2b, a material including one selected from the group consisting of tantalum oxide, lithium niobate, lithium tantalite, titanium oxide, niobium oxide and gallium phosphorus as a main component may be used. In this case, it is desirable that the material for grating portion 2b includes at least one selected from the group consisting of titanium, niobium, tantalum and lithium as an accessory component.

Furthermore, when the refractive index n becomes two or more, the Fresnel reflection at the surface of the grating portion 2b becomes large. However, in the diffractive optical element 8b of this embodiment, on the grating portion 2b, the AR coating is applied, thereby reducing the reflection loss on the surface of the diffractive optical element 8b (FIGS. 3 and 4 show the efficiency in the case where the AR coating is applied).

Furthermore, even when the refractive index n is, for example, 1.5 in such as glass or resin, the efficiency is lowered to some degree, but it is possible to form the diffractive optical element 8b as shown in FIG. 2.

Furthermore, in this embodiment, the light 3 with the first wavelength $\lambda 1$ and the light 4 with the second wavelength $\lambda 2$ are incident from the rear surface of the diffractive optical element 8b. However, the light may be incident from the front surface of the diffractive optical element 8b.

[Third Embodiment]

Figure 5A:
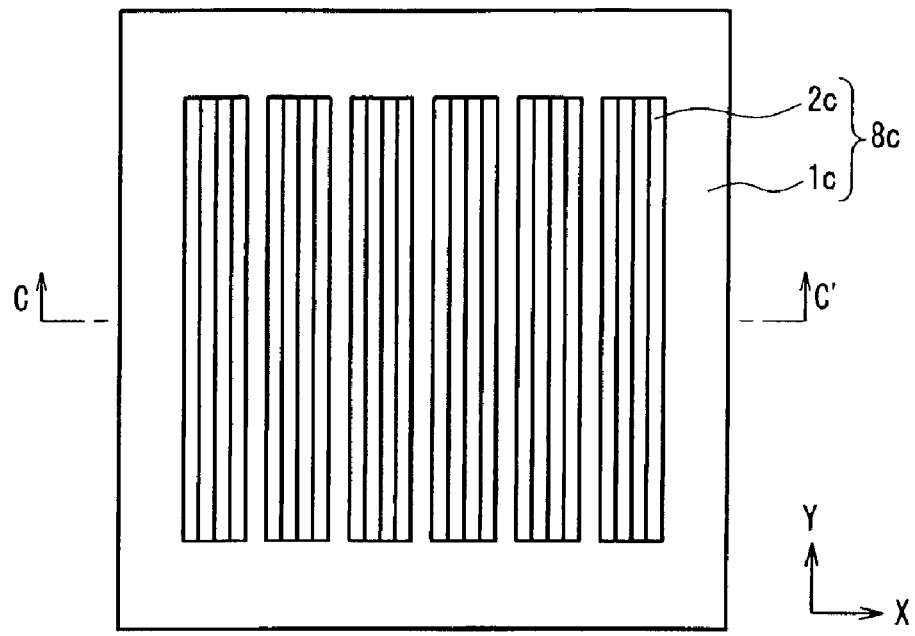
FIG. 5A is a plan view showing a diffractive optical element according to a third embodiment of the present invention.
Figure 5B:
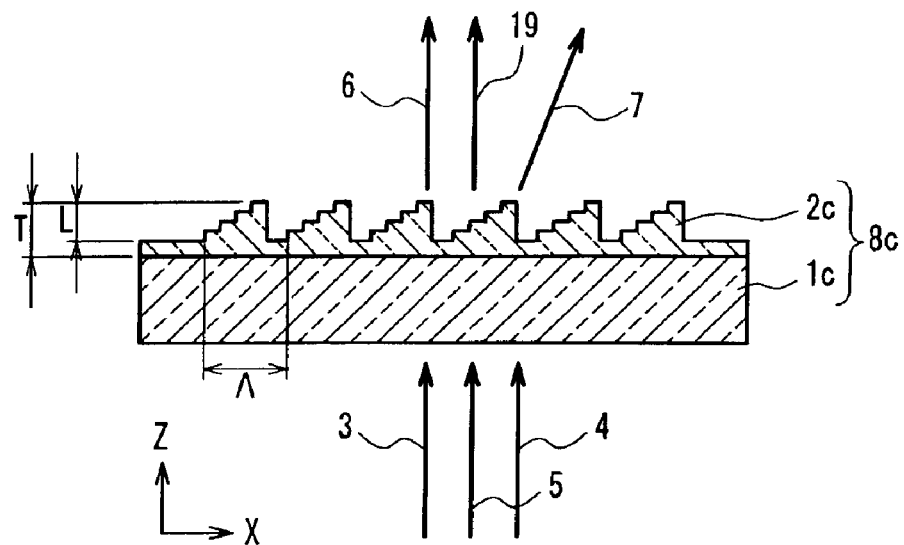
FIG. 5B is a cross-sectional view taken along the line C–C' in FIG. 5A.

Next, the diffractive optical element according to a third embodiment of the present invention will be described with reference to FIG. 5. FIG. 5A is a plan view showing a diffractive optical element according to the third embodiment of the present invention, and FIG. 5B is a cross-sectional view taken along the line C–C' in FIG. 5A.

As shown in FIG. 5, the diffractive optical element 8c of this embodiment includes a substrate 1c and a grating portion 2c formed on the substrate 1c. Herein, the grating portion 2c has a step-wise cross section with substantially any one of levels selected from four levels, five levels and six levels (FIG. 5 shows the grating portion having the step-wise cross section with five levels). The diffractive optical element 8c emits substantially zero-order diffracted light 6 when light 3 with a first wavelength λ1 satisfying the relationship: 0.35 μm≦λ1≦0.45 μm is incident from the rear surface thereof (a surface opposite to a surface on which the grating portion 2c is formed). Furthermore, the diffractive optical element 8c emits substantially first-order diffracted light 7 when light 4 with a second wavelength λ2 satisfying the relationship: 0.6 μm≦λ2≦0.7 μm is incident from the rear surface thereof. Furthermore, the diffractive optical element 8c emits substantially zero-order diffracted light 19 when light 5 with a third wavelength λ3 satisfying the relationship: 0.75 μm≦λ3≦0.85 μm is incident from the rear surface thereof. As mentioned above, the diffractive optical element 8c of this embodiment corresponds to three wavelengths and functions as a mere transmission device with respect to the light 3 with the first wavelength λ1 and the light 5 with the third wavelength λ3, and functions as an optical deflection element with respect to the light 4 with the second wavelength λ2.

Also in this embodiment, similar to the first and second embodiments, by setting a depth L of the grooves of the grating portion 2c to be substantially L=2λ1(p−1)/(n−1) where λ1 denotes a first wavelength, p denotes the number of steps of the grating portion 2c (p is any one of the levels selected from four, five and six) and n denotes a refractive index of the grating portion 2c, it is possible to improve the transmission efficiency of the light 3 to approximately the maximum level. For example, in the case where the number of levels is five (p=5), λ1=0.405 μm and n=1.5 are satisfied, the desirable depth L of the grooves of the grating portion 2c is 6.48 μm.

When the number of levels p is five, the transmission efficiency of the light 3 with the first wavelength λ1 is reduced as the period Λ of the grating portion 2c becomes small. When the period Λ of the grating portion 2c was 20 times or more as large as the first wavelength λ1, the transmission efficiency was about 68% to 93%. Furthermore, when the period Λ of the grating portion 2c was 20 times or more as large as the second wavelength λ2, the first-order diffraction efficiency of the light 4 with the second wavelength λ2 was about 63% to 73%. Furthermore, when the period Λ of the grating portion 2c was 20 times or more as large as the third wavelength λ3, the zero order diffraction efficiency of the light 5 with the third wavelength λ3 was about 68% to 93%.

The reason why the efficiency of light utilization is highest when the number of levels p is four is the same as in the diffractive optical element 8a in the first embodiment. Furthermore, by setting the refractive index n of the grating portion 2c to be two or more, the efficiency of light utilization (zero-order diffraction efficiency or first-order diffraction efficiency) is improved for the same reason as in the case of the diffractive optical element 8b in the second embodiment.

Furthermore, in this embodiment, the light 3 with the first wavelength λ1, the light 4 with the second wavelength λ2 and the light 5 with the third wavelength λ3 are incident from the rear surface of the diffractive optical element 8c, but the light may be incident from the front surface of the diffractive optical element 8c.

[Fourth Embodiment]

Figure 6A:
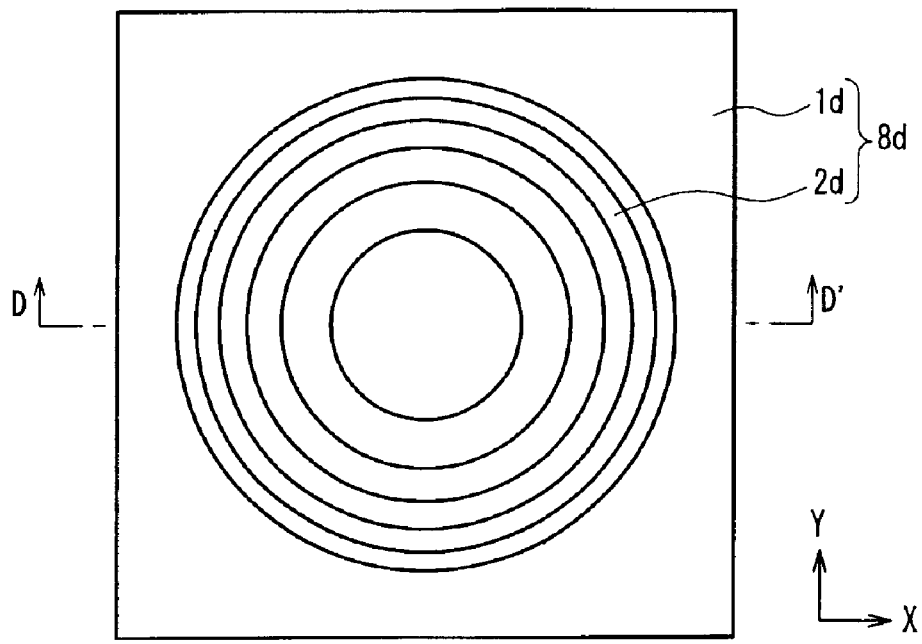
FIG. 6A is a plan view showing a diffractive optical element according to a fourth embodiment of the present invention.
Figure 6B:
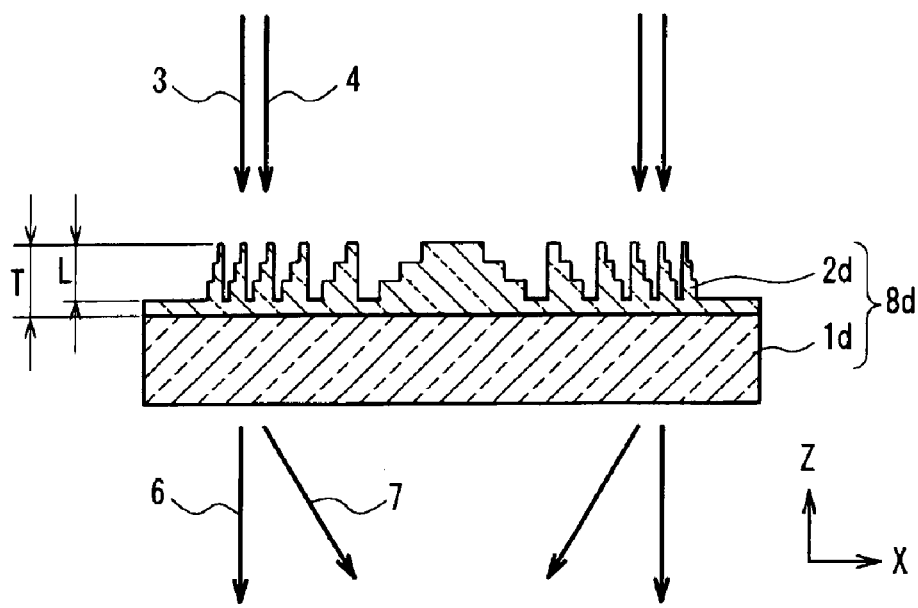
FIG. 6B is a cross-sectional view taken along the line D–D' in FIG. 6A.

Next, the diffractive optical element according to a fourth embodiment of the present invention will be described, focusing mainly on the difference from the diffractive optical element 8b of the above-mentioned second embodiment with reference to FIG. 6. FIG. 6A is a plan view showing a diffractive optical element according to the fourth embodiment of the present invention, and FIG. 6B is a cross-sectional view taken along the line D–D' in FIG. 6A.

As shown in FIG. 6, the diffractive optical element 8d of this embodiment includes a substrate 1d and a grating portion 2d formed on the substrate 1d. Herein, the grating portion 2d has a step-wise cross section with substantially any one of levels selected from four levels, five levels and six levels (FIG. 6 shows the grating portion 2d having the step-wise cross section with four levels). The diffractive optical element 8d emits substantially zero-order diffracted light 6 when light 3 with a first wavelength λ1 satisfying the relationship: 0.35 μm≦λ1≦0.45 μm is incident from the front surface thereof (a surface on which the grating portion 2d is formed). Furthermore, the diffractive optical element 8d emits substantially first-order diffracted light 7 when light 4 with a second wavelength λ2 satisfying the relationship: 0.6 μm≦λ2≦0.7 μm is incident from the front surface thereof.

By reducing the period of the grating portion 2d as closer to the outer periphery, the diffractive optical element 8d can function as a convex lens with respect to the light 4 with the second wavelength λ2. Therefore, the diffractive optical element 8d of this embodiment functions as a mere transmission device with respect to the light 3 with the first wavelength λ1 and functions as a convex diffractive microlens with respect to the light 4 with the second wavelength λ2.

The reason why the efficiency of light utilization is highest when the number of levels p is four is the same as in the diffractive optical element 8a in the first embodiment. Furthermore, by setting the refractive index n of the grating portion 2d to be two or more, the efficiency of light utilization (zero-order diffraction efficiency or first-order diffraction efficiency) is improved for the same reason as in the case of the diffractive optical element 8b in the second embodiment.

Also in this embodiment, similar to the third embodiment, in addition to the light 3 with the first wavelength λ1 and the light 4 with the second wavelength λ2, for light with a third wavelength λ3 satisfying the relationship: 0.75 μm≦λ3≦0.85 μm, substantially zero-order diffracted light may be emitted. Thus, the diffractive optical element corresponding to three wavelengths can be realized.

Furthermore, in this embodiment, the light 3 with the first wavelength λ1 and the light 4 with the second wavelength λ2 are incident from the front surface of the diffractive optical element 8d, but the light may be incident from the rear surface of the diffractive optical element 8d.

[Fifth Embodiment]

Figure 7A:
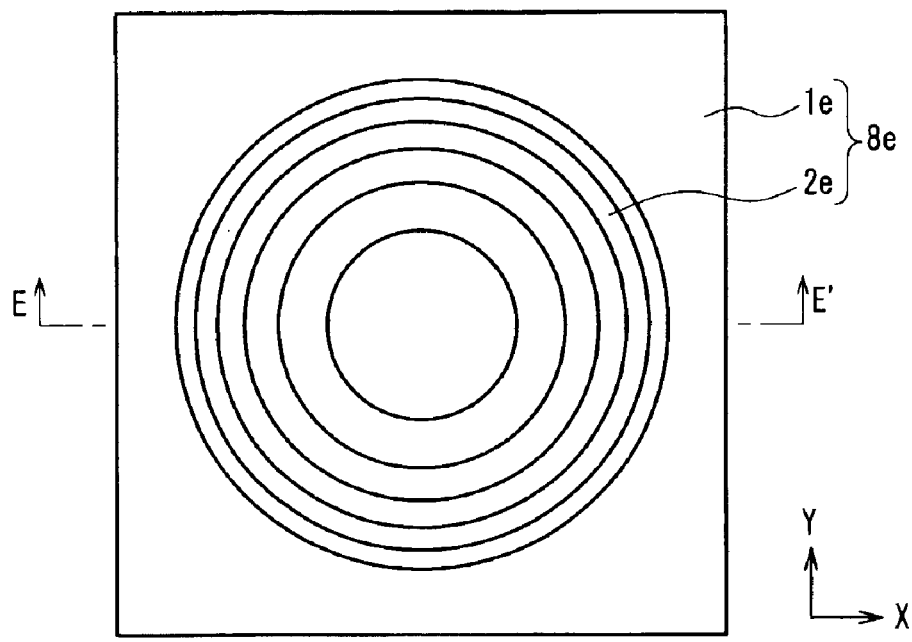
FIG. 7A is a plan view showing a diffractive optical element according to a fifth embodiment of the present invention.
Figure 7B:
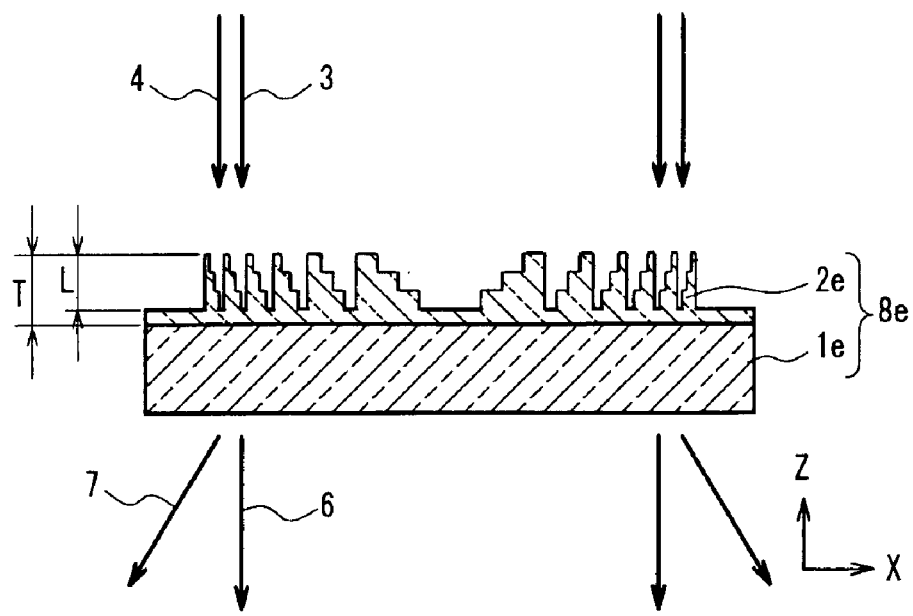
FIG. 7B is a cross-sectional view taken along the line E–E' in FIG. 7A.

Next, the diffractive optical element according to a fifth embodiment of the present invention will be described, focusing mainly on the difference from the diffractive optical element 8d of the fourth embodiment with reference to FIG. 7. FIG. 7A is a plan view showing a diffractive optical element according to the fifth embodiment of the present invention, and FIG. 7B is a cross-sectional view taken along the line E–E' in FIG. 7A.

As shown in FIG. 7, the diffractive optical element 8e of this embodiment includes a substrate 1e and a grating portion 2e formed on the substrate 1e. Herein, the grating portion 2e has a step-wise cross section with substantially any one of levels selected from four levels, five levels and six levels (FIG. 7 shows the grating portion 2e having the step-wise cross section with four levels). The diffractive optical element 8e emits substantially zero-order diffracted light 6 when light 3 with a first wavelength λ1 satisfying the relationship: 0.35 μm≦λ1≦0.45 μm is incident from the front surface thereof (a surface on which the grating portion 2e is formed). Furthermore, the diffractive optical element 8e emits substantially first-order diffracted light 7 when light 4 with a second wavelength λ2 satisfying the relationship: 0.6 μm≦λ2≦0.7 μm is incident from the front surface thereof.

In the diffractive optical element 8e of this embodiment, the structure of the groove of the grating portion 2e is opposite to that of the diffractive optical element 8d of the fourth embodiment. Therefore, the diffractive optical element 8e of this embodiment functions as a mere transmission device with respect to the light 3 with the first wavelength λ1 and functions as a concave diffractive microlens with respect to the light 4 with the second wavelength λ2.

The reason why the efficiency of light utilization is highest when the number of levels p is four is the same as in the diffractive optical element 8a in the first embodiment. Furthermore, by setting the refractive index n of the grating portion 2e to be two or more, the efficiency of light utilization (zero-order diffraction efficiency or first-order diffraction efficiency) is improved for the same reason as in the case of the diffractive optical element 8b in the second embodiment.

Also in this embodiment, similar to the third embodiment, in addition to the light 3 with the first wavelength λ1 and the light 4 with the second wavelength λ2, for light with a third wavelength λ3 satisfying the relationship: 0.75 μm≦λ3≦0.85 μm, substantially zero-order diffracted light may be emitted. Thus, the diffractive optical element corresponding to three wavelengths can be realized.

Furthermore, in this embodiment, the light 3 with the first wavelength λ1 and the light 4 with the second wavelength λ2 are incident from the front surface of the diffractive optical element 8e, but the light may be incident from the rear surface of the diffractive optical element 8e.

[Sixth Embodiment]

Figure 8:
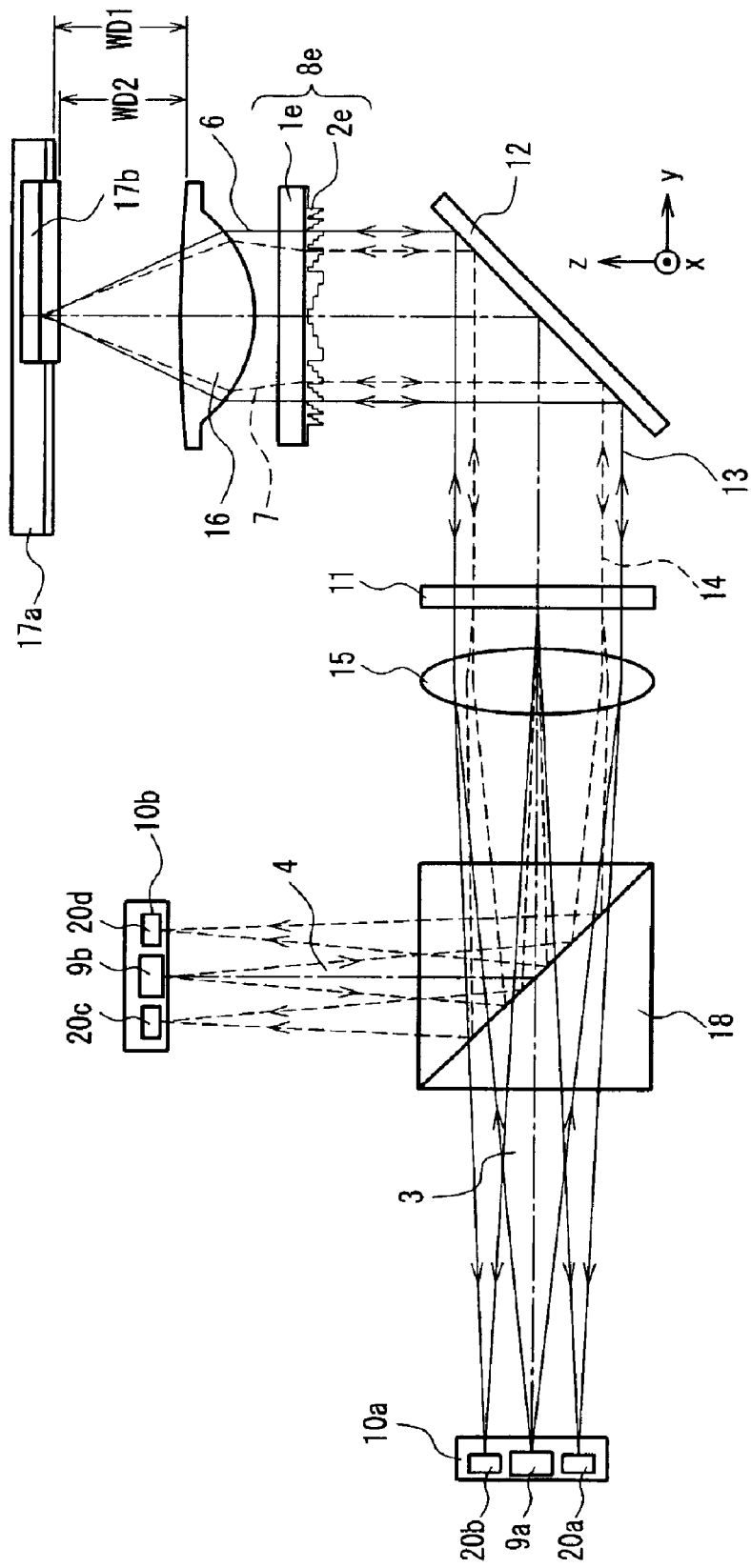
FIG. 8 is a side elevation showing a basic configuration of an optical head according to a sixth embodiment of the present invention and its light transmission path.

Next, an optical head according to a sixth embodiment of the present invention will be described with reference to FIG. 8. FIG. 8 is a side elevation showing a basic configuration of the optical head according to the sixth embodiment of the present invention and its light transmission path.

The optical head of this embodiment includes a first light source 9a emitting light 3 with a first wavelength λ1 satisfying the relationship: 0.35 μm≦λ1≦0.45 μm, a second light source 9b emitting light with a second wavelength λ2 satisfying the relationship: 0.6 μm≦λ2≦0.7 μm, an objective lens 16 for converging light 13 (parallel light) with a first wavelength λ1 and light 14 (parallel light) with a second wavelength λ2 respectively onto a first information recording medium (optical disk) 17a having a first transparent protective layer or a second information recording medium (optical disk) 17b having a second transparent protective layer that is thicker than the first transparent protective layer, photo-detectors 20a to 20d for detecting light from the first information recording medium 17a and the second information recording medium 17b, and the diffractive optical element 8e described in the fifth embodiment, which is disposed in a common light path of the light 13 (parallel light) with the first wavelength λ1 and the light 14 (parallel light) with the second wavelength λ2.

The diffractive optical element 8e emits substantially zero-order diffracted light 6 when the light 13 (parallel light) with the first wavelength λ1 satisfying the relationship: 0.35 μm≦λ1≦0.45 μm is incident from the front surface thereof (a surface on which the grating portion 2e is formed). Then, this zero-order diffracted light 6 is converged onto the first information recording medium 17a by the objective lens 16. The diffractive optical element 8e emits substantially first-order diffracted light 7 when the light 14 (parallel light) with the second wavelength λ2 satisfying the relationship: 0.6 μm≦λ2≦0.7 μm is incident from the front surface thereof. Then, this first-order diffracted light 7 is converged onto the second information recording medium 17b by the objective lens 16.

The diffractive optical element 8e is designed so that it corrects the sum of a spherical aberration of the objective lens 16 with respect to the light 14 (parallel light) with the second wavelength λ2 and a spherical aberration generated when the emitted light corresponding to the light 14 (parallel light) with the second wavelength λ2 from the objective lens 16 passes through the second transparent protective layer of the second information recording medium 17b. With such a design, it was possible to excellently converge the light 14 (parallel light) with the second wavelength λ2 onto the second information recording medium 17b.

Note here that the diffractive optical element 8e is disposed with the substrate 1e thereof facing the objective lens 16. However, the diffractive optical element 8e may be disposed with the grating portion 2e thereof facing the objective lens 16. The same is true in the below mentioned seventh embodiment and ninth embodiment.

Furthermore, the diffractive optical element 8e may be disposed between the objective lens 16 and the information recording medium 17. In this case, instead of forming the grating portion 2e on the substrate 1e, the grating portion 2e may be provided directly on the objective lens 16. By providing the grating portion 2e directly on the objective lens 16, a stable structure can be achieved. When the diffractive optical element 8e is disposed like this, when light emitted from the objective lens 16 and being incident on the diffractive optical element 8e is the light with the first wavelength λ1, the diffractive optical element 8e emits substantially zero-order diffracted light 6. Furthermore, when light emitted from the objective lens 16 and being incident on the diffractive optical element 8e is the light with the second wavelength λ2, the diffractive optical element 8e emits substantially first-order diffracted light 7. Then, the zero-order diffracted light 6 emitted from the diffractive optical element 8e is converged onto the first information recording medium 17a and the first-order diffracted light 7 emitted from the diffractive optical element 8e is converged onto the second information recording medium 17b.

In the optical head of this embodiment, unit 10a, in which the light source 9a and photo-detector 20a, 20b are integrated, and unit 10b, in which the light source 9b and photo-detector 20c, 20d are integrated, are used. Then, by using a beam splitter 18, the optical axis of the light 3 with the first wavelength λ1 is allowed to coincide with the optical axis of the light 4 with the second wavelength λ2. The light 3, 4 with both wavelengths in which both optical axes coincide with are collimated by a collimator lens 15 into parallel light 13, 14; pass through a focus/track error signal detection element 11 (zero-order diffracted light is used in the outgoing light and first-order diffracted light is used in the return light), and thereafter the optical axes are bent by a mirror 12 at an angle of 90° so as to be incident on the diffractive optical element 8e.

The first wavelength λ1 is, for example, 0.405 μm and the second wavelength λ2 is, for example, 0.658 μm. The numerical aperture of the objective lens 16 is, for example, 0.85 for the first wavelength λ1 and 0.6 for the second wavelength λ2. The thickness of the first transparent protective layer in the first information recording medium 17a that is a high density optical disk is, for example, 0.1 mm (total thickness of the first information recording medium 17a is 1.2 mm) and the thickness of the second transparent protective layer in the second information recording medium 17b that is a DVD is, for example, 0.6 mm (total thickness of the second information recording medium 17b is 1.2 mm).

In the optical head in this embodiment, a working distance WD2 from the objective lens 16 to the second information recording medium 17b is smaller than a working distance WD1 from the objective lens 16 to the first information recording medium 17a. The diffractive optical element 8e functions as a concave lens with respect to the light 4 with the second wavelength λ2. The light 4 with the second wavelength λ2 passes through the concave lens (diffractive optical element 8e) and the objective lens 16 sequentially and is converged onto the second information recording medium 17b. Therefore, when the relationship: WD1>WD2 is satisfied, the focal power of the concave lens may be small (numerical aperture (NA) of a concave lens is small). Accordingly, since the period Λ of the grating portion 2e of the diffractive optical element 8e becomes large, as shown in FIGS. 3 and 4, the efficiency of light utilization is increased, thus making it easy to manufacture the diffractive optical element 8e.

[Seventh Embodiment]

Figure 9:
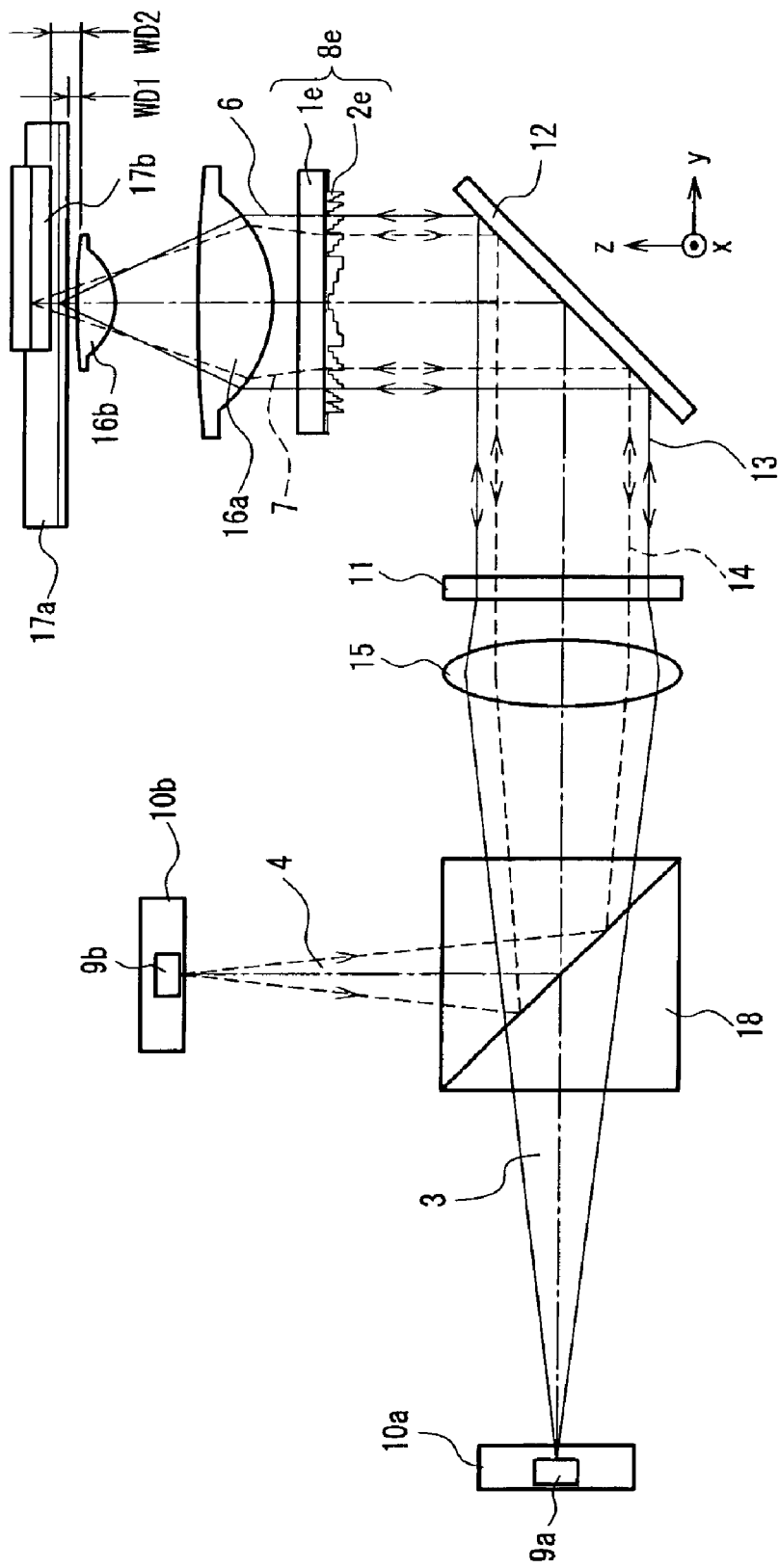
FIG. 9 is a side elevation showing a basic configuration of an optical head according to a seventh embodiment of the present invention and its light transmission path.

Next, the optical head according to a seventh embodiment of the present invention will be described with reference to FIG. 9, focusing mainly on the difference from the optical head of the sixth embodiment. FIG. 9 is a side elevation showing a basic configuration of the optical head according to the seventh embodiment of the present invention and its light transmission path.

As shown in FIG. 9, in this embodiment, the objective lens includes a first lens 16a and a second lens 16b (two-lens structure), and a converging lens having, for example, numerical aperture (NA) of 0.85 is formed. When the numerical aperture (NA) is 0.65 or more, as compared with the objective lens having a single-lens structure as in the sixth embodiment mentioned above, the objective lens having the two-lens structure as in this embodiment is not susceptible to the error in the field angle, tilt, or the like, although the objective lens having a two-lens structure requires the adjustment between lenses.

In the optical head of this embodiment, a working distance WD2 from the objective lens 16b to the second information recording medium 17b is larger than a working distance WD1 from the objective lens 16b to the first information recording medium 17a. When the objective lens is made of two lenses, WD1 tends to be small, for example, 0.15 mm. However, in the second information recording medium 17b that is a DVD, by setting WD2 to be, for example, 0.3 mm, it is possible to reduce collision of the warped DVD into the objective lens 16b.

[Eighth Embodiment]

Figure 10:
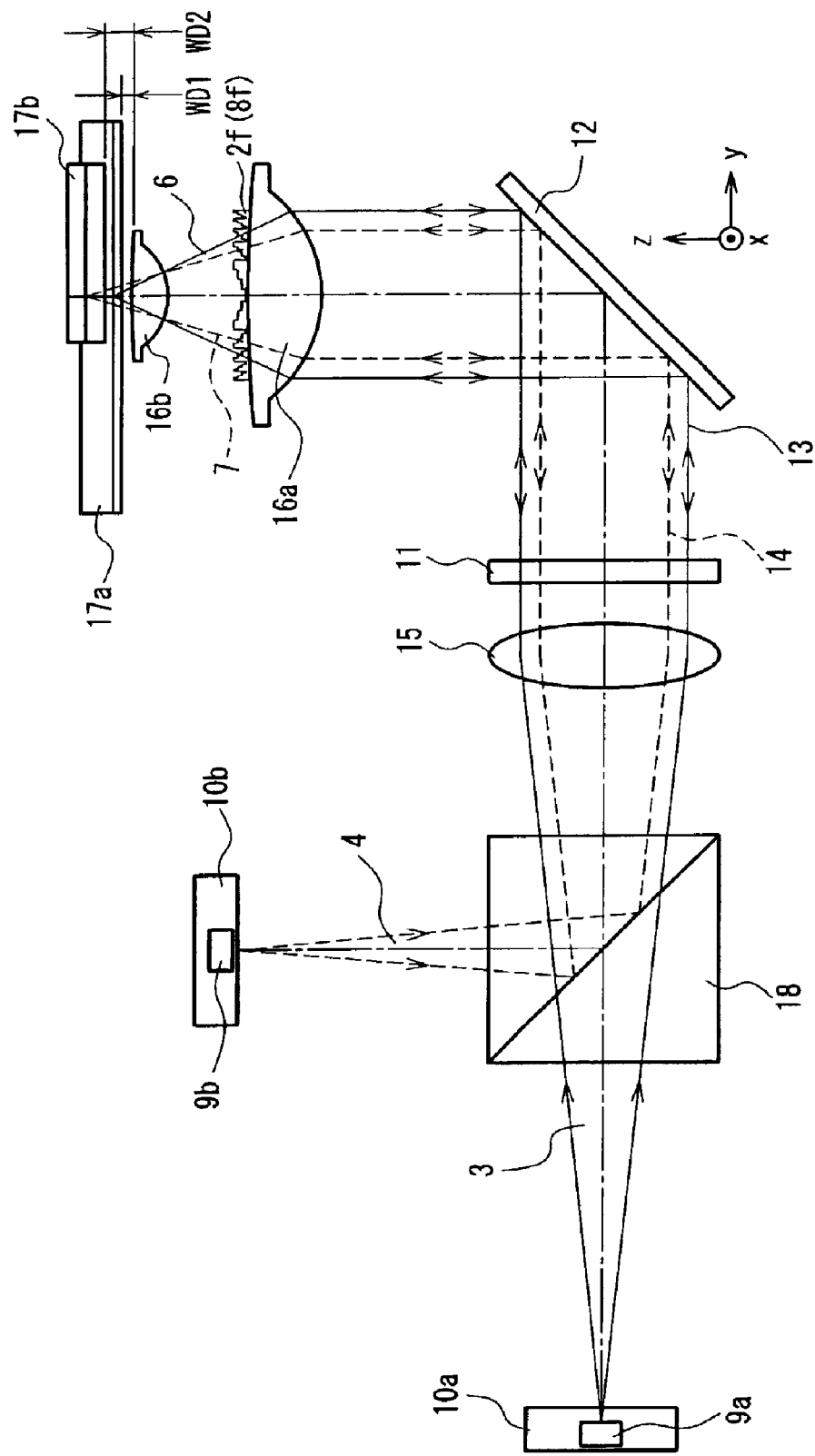
FIG. 10 is a side elevation showing a basic configuration of an optical head according to an eight embodiment of the present invention and its light transmission path.

Next, the optical head according to an eighth embodiment of the present invention will be described with reference to FIG. 10, focusing mainly on the difference from the optical head of the seventh embodiment. FIG. 10 is a side elevation showing a basic configuration of the optical head according to the eighth embodiment of the present invention and its light transmission path.

The optical head of this embodiment includes a first light source 9a emitting light 3 with a first wavelength λ1 satisfying the relationship: $0.35 \, \mu m \leq \lambda 1 \leq 0.45 \, \mu m$, a second light source 9b emitting light 4 with a second wavelength λ2 satisfying the relationship: $0.6 \, \mu m \leq \lambda 2 \leq 0.7 \, \mu m$, an objective lens including a first lens 16a and a second lens 16b for converging the light 13 (parallel light) with the first wavelength λ1 and the light 14 (parallel light) with the second wavelength λ2 respectively onto a first information recording medium 17a having a first transparent protective layer or a second information recording medium 17b having a second transparent protective layer that is thicker than the first transparent protective layer, photo-detectors (not shown in this drawing) for detecting light from the first and second information recording media 17a, 17b, and a grating portion 2f of a diffractive optical element 8f having an approximate shape described in the fifth embodiment, which is disposed in a light path between the first lens 16a and the second lens 16b.

When the light 13 with the first wavelength λ1 emitted from the first lens 16a is incident on the diffractive optical element 8f, the diffractive optical element 8f emits substantially zero-order diffracted light 6. Then, the zero-order diffracted light 6 emitted from the diffractive optical element 8f is converged onto the first information recording medium 17a by the second lens 16b. Furthermore, when the light 14 with the second wavelength λ2 emitted from the first lens 16a is incident on the diffractive optical element 8f, the diffractive optical element 8f emits substantially first-order diffracted light 7. Then, the first-order diffractive light 7 emitted from the diffractive optical element 8f is converged onto the second information recording medium 17b by the second lens 16b.

In this embodiment, the light 13 with the first wavelength λ1 and the light 14 with the second wavelength λ2 are incident from the rear surface of the diffractive optical element 8f, but the light may be incident from the front surface of the diffractive optical element 8f.

Furthermore, in this embodiment, the grating portion 2f of the diffractive optical element 8f is formed on the first lens 16a closer to the light source 9 among the first lens 16a and the second lens 16b and the substrate is omitted. With such a configuration, it is possible to reduce the number of components and the structure becomes stable. Note here that the grating portion 2f of the diffractive optical element 8f may be formed on the surface having a larger curvature at the side facing the mirror 12 of the first lens 16a, or may be formed on the surface at the side facing the information recording medium 17 of the second lens 16b or on the surface having a larger curvature at the side facing the first lens 16a of the second lens 16b.

[Ninth Embodiment]

Figure 11:
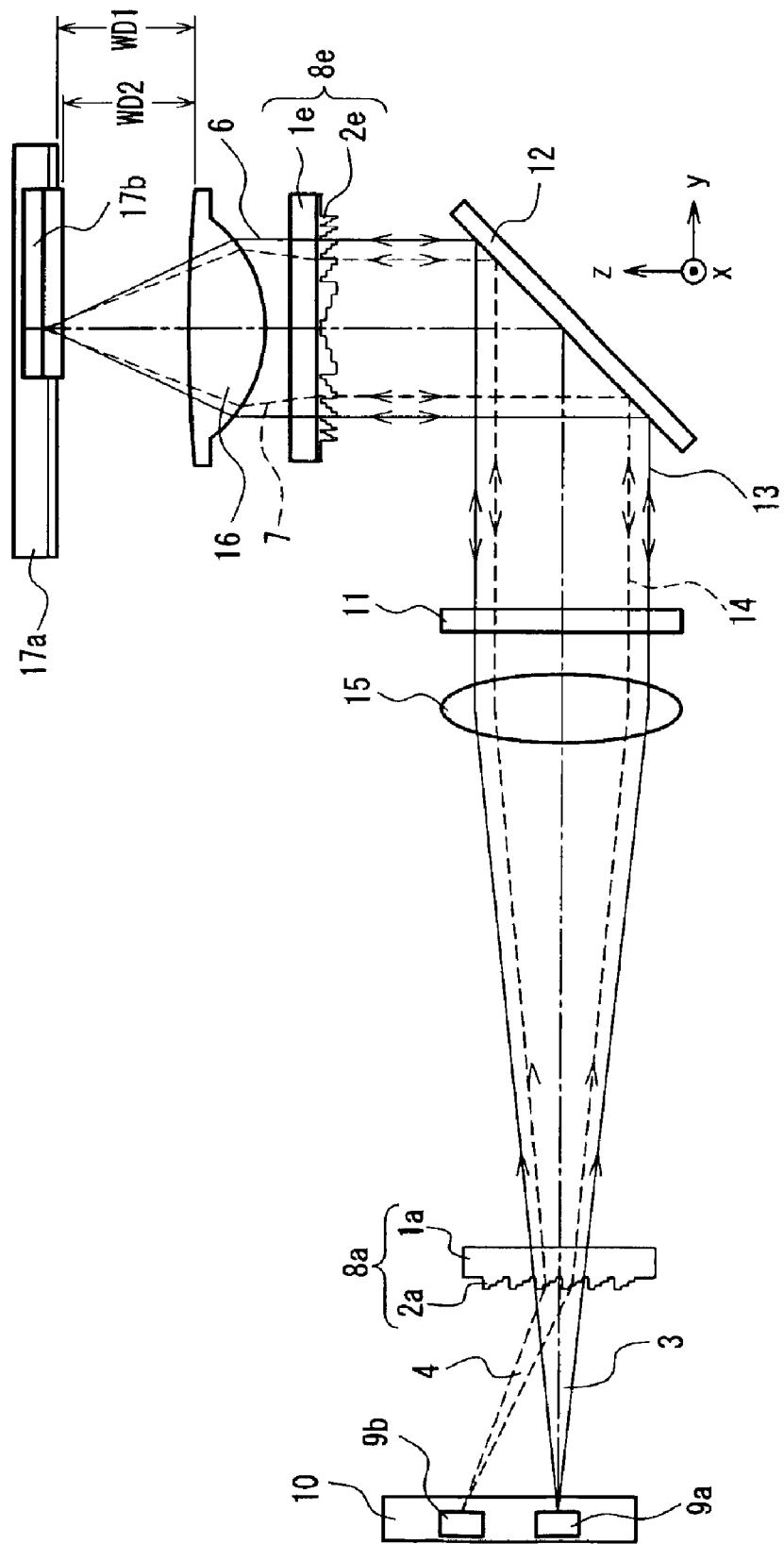
FIG. 11 is a side elevation showing a basic configuration of an optical head according to a ninth embodiment of the present invention and its light transmission path.

Next, the optical head according to a ninth embodiment of the present invention will be described with reference to FIG. 11, focusing mainly on the difference from the optical head of the sixth embodiment. FIG. 11 is a side elevation showing a basic configuration of the optical head according to the ninth embodiment of the present invention and its light transmission path.

The optical head of this embodiment includes a first light source 9a emitting light 3 with a first wavelength λ1 satisfying the relationship: $0.35 \, \mu m \leq \lambda 1 \leq 0.45 \, \mu m$, a second light source 9b emitting light 4 with a second wavelength λ2 satisfying the relationship: $0.6 \, \mu m \leq \lambda 2 \leq 0.7 \, \mu m$, an objective lens 16 for converging the light 13 (parallel light) with a first wavelength $\lambda 1$ and the light 14 (parallel light) with a second wavelength $\lambda 2$ respectively onto a first information recording medium 17a or a second information recording medium 17b, photo-detectors (not shown in this drawing) for detecting light from the first and second information recording media 17a, 17b, and a diffractive optical element 8a of the first embodiment, which is disposed in a common light path of the light with both wavelengths between the light source 9 and the objective lens 16.

The diffractive optical element 8a emits substantially zero-order diffracted light 13 when the light 3 with the first wavelength $\lambda 1$ is incident from the front surface thereof (a surface on which the grating portion 2a is formed). Then, this zero-order diffracted light 13 is converged onto the first information recording medium 17a by the objective lens 16. The diffractive optical element 8a emits substantially first-order diffracted light 14 when the light 4 with the second wavelength $\lambda 2$ is incident from the front surface thereof. Then, this first-order diffracted light 14 allows its optical axis to be substantially the same as the optical axis of the light 13 with the first wavelength $\lambda 1$ and thereafter is converged onto the second information recording medium 17b by the objective lens 16.

In the optical head of this embodiment, the first light source 9a and the second light source 9b are incorporated into a light source/photo-detector unit 10, and the optical axis of the light 3 with the first wavelength $\lambda 1$ is allowed to coincide with the optical axis of the light 4 with the second wavelength $\lambda 2$. With such a configuration, it is possible to reduce the number of components and the structure becomes stable.

Furthermore, in the optical head of this embodiment, a further diffractive optical element 8e is disposed between the objective lens 16 and the mirror 12. However, this diffractive optical element 8e is not necessarily required, and other means may be employed.

As mentioned above, in the first to ninth embodiments, the diffractive optical element and the optical head were described. However, the present invention is not necessarily limited to these embodiments. The same effect can be obtained by employing a diffractive optical element or an optical head in which the diffractive optical element or optical head of the respective embodiment are combined.

Note here that the objective lens and collimator lens are named for the sake of convenience, and these lenses are the same as general lens.

Furthermore, in the sixth to ninth embodiments, cases where the diffractive optical element is applied to the optical head for the optical disk are described as an example. However, the diffractive optical element of the present invention can be applied to the optical head for the medium in a form of card, drum or tape whose specification such as a thickness, recording density, etc. are different.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A diffractive optical element comprising a substrate and a grating portion formed on the substrate, wherein the grating portion has a step-wise cross section with substantially any one of levels selected from four levels, five levels and six levels, and the diffractive optical element emits substantially zero-order diffracted light that has been transmitted through the grating portion when light with a first wavelength $\lambda 1$ satisfying the relationship: $0.35 \, \mu m \leq \lambda 1 \leq 0.45 \, \mu m$ is incident and emits substantially first-order diffracted light that has been transmitted through the grating portion when light with a second wavelength $\lambda 2$ satisfying the relationship: $0.6 \, \mu m \leq \lambda 2 \leq 0.7 \, \mu m$ is incident, wherein the diffraction efficiency of the first order diffracted light with the second wavelength $\lambda 2$ is 50% or higher.

2. The diffractive optical element according to claim 1, the element emits substantially zero-order diffracted light when light with a third wavelength $\lambda 3$ satisfying the relationship: $0.75 \, \mu m \leq \lambda 3 \leq 0.85 \, \mu m$ is incident.

3. The diffractive optical element according to claim 1, wherein a depth of a grooves of the grating portion is expressed by substantially $2\lambda 1(p-1)(n-1)$ where p denotes the number of levels of the grating portion (p is any one of levels selected from four, five and six), and n denotes a refractive index of the grating portion.

4. The diffractive optical element according to claim 1, wherein the refractive index of the grating portion is 2 or more.

5. The diffractive optical element according to claim 4, wherein a material of the grating portion is one selected from the group consisting of tantalum oxide, lithium niobate, lithium tantalite, titanium oxide, niobium oxide and gallium phosphorus, or a material comprising the one selected material as a main component.

6. The diffractive optical element according to claim 4, wherein a material of the grating portion comprises one selected from the group consisting of tantalum oxide, lithium niobate, lithium tantalite, titanium oxide, niobium oxide and gallium phosphorus as a main component, and at least one selected from the group consisting of titanium, niobium, tantalum and lithium as an accessory component.

7. The diffractive optical element according to claim 1, wherein the grating portion is formed by depositing a thin film on the substrate to the thickness of larger than $2\lambda 1(p-1)/(n-1)$ and processing the thin film where p denotes the number of levels of the grating portion (p is any one of levels selected from four, five and six), and n denotes a refractive index of the grating portion, and a depth of a grooves of the grating portions is expressed by substantially $2\lambda 1(p-1)/(n-1)$.

8. An optical head comprising a first light source emitting light with a first wavelength $\lambda 1$ satisfying the relationship: $0.35 \, \mu m \leq \lambda 1 \leq 0.45 \, \mu m$, a second light source emitting light with a second wavelength $\lambda 2$ satisfying the relationship: $0.6 \, \mu m \leq \lambda 2 \leq 0.7 \, \mu m$, an objective lens for converging light with the first wavelength $\lambda 1$ and light with the second wavelength $\lambda 2$ respectively onto a first information recording medium having a first transparent protective layer or a second information recording medium having a second transparent protective layer that is thicker than the first transparent protective layer, a photo-detector for detecting light from the first and second information recording media, and the diffractive optical element according to claim 1, which is disposed in a common light path of light with both wavelengths between the light sources and the objective lens, wherein when the light with the first wavelength $\lambda 1$ is incident on the diffractive optical element, the diffractive optical element emits substantially zero-order diffracted light that has been transmitted through the grating portion and the zero-order diffracted light is converged onto the first information recording medium by the objective lens, and when the light with the second wavelength λ2 is incident on the diffractive optical element, the diffractive optical element emits substantially first-order diffracted light that has been transmitted through the grating portion and the first-order diffracted light is converged onto the second information recording medium by the objective lens.

9. The optical head according to claim 8, wherein the diffractive optical element corrects the sum of a spherical aberration of the objective lens with respect to the light with a second wavelength λ2 and a spherical aberration generated when the emitted light corresponding to the light with a second wavelength λ2 from the objective lens passes through the second transparent protective layer of the second information recording medium.

10. The optical head according to claim 8, wherein a working distance from the objective lens to the second information recording medium is smaller than a working distance from the objective lens to the first information recording medium.

11. The optical head according to claim 8, wherein a working distance from the objective lens to the second information recording medium is larger than a working distance from the objective lens to the first information recording medium.

12. An optical head comprising
a first light source emitting light with a first wavelength λ1 satisfying the relationship: $0.35\ \mu m \leq \lambda 1 \leq 0.45\ \mu m$,
a second light source emitting light with a second wavelength λ2 satisfying the relationship: $0.6\ \mu m \leq \lambda 2 \leq 0.7\ \mu m$,
an objective lens for converging the light with the first wavelength λ1 and the light with the second wavelength λ2 respectively onto a first information recording medium having a first transparent protective layer or a second information recording medium having a second transparent protective layer that is thicker than the first transparent protective layer,
a photo-detector for detecting light from the first and second information recording media, and
the diffractive optical element according to claim 1, which is disposed in a common light path of light with both wavelengths between the objective lens and the information recording media, wherein,
when the light with the first wavelength λ1 emitted from the objective lens is incident on the diffractive optical element, the diffractive optical element emits substantially zero-order diffracted light that has been transmitted through the grating portion and the zero-order diffracted light is converged onto the first information recording medium, and
when the light with the second wavelength λ2 emitted from the objective lens is incident on the diffractive optical element, the diffractive optical element emits substantially first-order diffracted light that has been transmitted through the grating portion and the first-order diffracted light is converged onto the second information recording medium.

13. The optical head according to claim 12, wherein the diffractive optical element corrects the sum of a spherical aberration of the objective lens with respect to the light with a second wavelength λ2 and a spherical aberration generated when the emitted light corresponding to the light with a second wavelength λ2 from the objective lens passes through the second transparent protective layer of the second information recording medium.

14. The optical head according to claim 12, wherein a working distance from the objective lens to the second information recording medium is smaller than a working distance from the objective lens to the first information recording medium.

15. The optical head according to claim 12, wherein a working distance from the objective lens to the second information recording medium is larger than a working distance from the objective lens to the first information recording medium.

16. An optical head comprising
a first light source emitting light with a first wavelength λ1 satisfying the relationship: $0.35\ \mu m \leq \lambda 1 \leq 0.45\ \mu m$,
a second light source emitting light with a second wavelength λ2 satisfying the relationship: $0.6\ \mu m \leq \lambda 2 \leq 0.7\ \mu m$,
an objective lens comprising first and second lenses for converging the light with a first wavelength λ1 and the light with a second wavelength λ2 respectively onto a first information recording medium having a first transparent protective layer or a second information recording medium having a second transparent protective layer that is thicker than the first transparent protective layer,
a photo-detector for detecting light from the first and second information recording media, and
the diffractive optical element according to claim 1, which is disposed in a common optical path between the first lens and the second lens, wherein
when the light with the first wavelength λ1 emitted from the first lens is incident on the diffractive optical element, the diffractive optical element emits substantially zero-order diffracted light that has been transmitted through the grating portion and the zero-order diffracted light is converged onto the first information recording medium by the second lens, and
when the light with the second wavelength λ2 emitted from the first lens is incident on the diffractive optical element, the diffractive optical element emits substantially first-order diffracted light that has been transmitted through the grating portion and the first-order diffracted light is converged onto the second information recording medium by the second lens.

17. The optical head according to claim 16, wherein the diffractive optical element corrects the sum of a spherical aberration of the objective lens with respect to the light with a second wavelength λ2 and a spherical aberration generated when the emitted light corresponding to the light with a second wavelength λ2 from the objective lens passes through the second transparent protective layer of the second information recording medium.

18. The optical head according to claim 16, wherein a working distance from the objective lens to the second information recording medium is smaller than a working distance from the objective lens to the first information recording medium.

19. The optical head according to claim 16, wherein a working distance from the objective lens to the second information recording medium is larger than a working distance from the objective lens to the first information recording medium.

20. An optical head comprising a first light source emitting light with a first wavelength $\lambda 1$ satisfying the relationship: $0.35 \mu m \leqq \lambda 1 \leqq 0.45 \mu m$, a second light source emitting light with a second wavelength $\lambda 2$ satisfying the relationship: $0.6 \mu m \leqq \lambda 2 \leqq 0.7 \mu m$, an objective lens for converging the light with a first wavelength $\lambda 1$ and the light with a second wavelength $\lambda 2$ respectively onto a first information recording medium or a second information recording medium, a photo-detector for detecting light from the first and second information recording media, and a diffractive optical element according to claim 1, which is disposed in a common light path of the light with both wavelengths between the light sources and the objective lens, wherein when the light with the first wavelength $\lambda 1$ is incident on the diffractive optical element, the diffractive optical element emits substantially zero-order diffracted light that has been transmitted through the grating portion and the zero-order diffracted light is converged onto the first information recording medium by the objective lens, and when the light with the second wavelength $\lambda 2$ is incident on the diffractive optical element, the diffractive optical element emits substantially first-order diffracted light that has been transmitted through the grating portion, and the optical axis of the first-order diffracted light is allowed to coincide substantially with the optical axis of the light with a first wavelength $\lambda 1$ and thereafter converged onto the second information recording medium by the objective lens.

\* \* \* \* \*